United States Patent [19]
Sohner

[11] Patent Number: 5,717,579
[45] Date of Patent: Feb. 10, 1998

[54] POWER SUPPLY UNIT, MORE SPECIFICALLY BATTERY CHARGER FOR ELECTRIC VEHICLES AND THE LIKE

[76] Inventor: Walter Sohner, Kirchhofstrasse 53a, 76149, Karlsruhe, Germany

[21] Appl. No.: 776,823

[22] PCT Filed: Jul. 20, 1995

[86] PCT No.: PCT/DE95/00985

§ 371 Date: Jan. 21, 1997

§ 102(e) Date: Jan. 21, 1997

[87] PCT Pub. No.: WO96/03791

PCT Pub. Date: Feb. 8, 1996

[30] Foreign Application Priority Data

Jul. 22, 1994 [DE] Germany ............ 44 26 017.2

[51] Int. Cl.$^6$ .................................................. H02J 7/08
[52] U.S. Cl. ............................................................ 363/21
[58] Field of Search ............................. 320/2, 3, 4, 8, 320/14, 15, 17, 18–20, 39–41; 307/46, 66, 67, 68; 363/20–21

[56] References Cited

U.S. PATENT DOCUMENTS

| | | | |
|---|---|---|---|
| 4,331,911 | 5/1982 | Park | 320/14 |
| 4,347,560 | 8/1982 | Seiersen | 363/24 |
| 4,656,412 | 4/1987 | McLyman | 320/39 |
| 4,809,151 | 2/1989 | Ota | 363/21 |
| 5,003,244 | 3/1991 | Davis, Jr. | 320/17 |

FOREIGN PATENT DOCUMENTS

| | | | |
|---|---|---|---|
| 0 431 778 A1 | 6/1991 | European Pat. Off. | H02M 3/156 |
| 0 550 167 A2 | 7/1993 | European Pat. Off. | H02M 3/335 |
| 0 573 832 A1 | 12/1993 | European Pat. Off. | H02J 7/00 |
| 2694144 | 1/1994 | France | H02M 7/797 |
| 39 40 928 C1 | 12/1989 | Germany | H01M 10/42 |
| 41 12 907 C1 | 4/1991 | Germany | H02M 1/12 |
| 64-233546 | 4/1991 | Japan | H02M 3/28 |

OTHER PUBLICATIONS

International Search Report corresponding to PCT/DE95/00985.

"An SMR Topology with Suppressed DC Link Components and Predictive Line Current Waveshaping", IEEE Transactions On Industry Applications, vol. 1A–23, No. 4, Jul./Aug. 1987, 644–653.

"Power Factor Correction With The UC3854", by Claudio de Sa e Silva, Senior Applications Engineer, Unitrode Integrated Circuits.

"Aktives Oberschwingungsfilter Mit Konstanter Betriebsfrequenz Und 600 W Ausgangsleistung", PD 22 9002 Siemens, Auto–/Industrieelektronik.

"Kompakter serienreifer Antrieb fur Elektrofahrzeuge", Brown Boven Technik May 1985, pp. 229–234.

*Primary Examiner*—Aditya Krishnan
*Attorney, Agent, or Firm*—Baker & Daniels

[57] ABSTRACT

A clocked current supply apparatus for connection to the network with one or several cables has at least one input rectifier, at least one regulator for generating a sequence of current pulses, at least one adapter network for separately transmitting potential and current pulses and a pair of output terminals for each adapter network to which a voltage-controlling element (accumulator, capacitor) is connected. The adapter network (AN) consists of an adapter transformer (TR) and several blocking diodes (DL,DE) that connect the output terminals (KA+, KA−) to the secondary winding system of the adapter transformer (TR). In addition, a regulator that consists of at least one choking coil (L), at least one pair of electronic switches (ES1,ES2) driven by a controller (STG) and one voltage limiter (BGU) is arranged between the rectifier (GR) and the adapter network (AN). The regulator generates a sequence of current pulses from the rectified mains voltage or from a direct voltage preferably connected to the apparatus by switches (SW). The energy of the current pulses flows through the adapter network (AN) to the output.

8 Claims, 10 Drawing Sheets

POWER SUPPLY UNIT, MORE SPECIFICALLY BATTERY CHARGER FOR ELECTRIC VEHICLES AND THE LIKE

CROSS-REFERENCE TO RELATED APPLICATIONS

The present application is a National Stage Application under 35 U.S.C. §371, of PCT International Patent Application Number PCT/DE95/00985, (published as International Publication Number WO 96/03791), filed Jul. 20, 1995, that designated the United States.

BACKGROUND OF THE INVENTION

1. Field of the Invention

The present invention relates to a switched-mode power supply unit with single-phase or multi-phase mains connection for the generation of isolated d.c. voltages, and more specifically for charging a single battery or battery strings. The invention in particular relates to a battery charger for electric vehicles or the like.

2. Description of the Related Art

In general, power supply units, especially those of high power ratings, are expected to load the mains with active power only. To keep charging times of high-capacity batteries short it is aimed at fully using the maximum power supplied by the mains, whereby the waveform of the line voltage must not unsuitably be distorted by line current interference. Moreover, batteries that consist of a string of series-connected electrochemical cells shall, in general, have a long service life. Premature damages and early failures of single battery blocks due to, in practice, unavoidable differences in capacities of the battery blocks can be avoided by obtaining, in each charging procedure, identical voltages for the individual battery blocks. During a discharging cycle the differences in capacity between the single battery blocks can be compensated by corresponding permanent charge equalisation performed by the charger.

It is well-known that, because of their excellent efficiency, switched-mode power supply units are used for charging batteries. According to the best known working principle the line voltage is converted into a smoothed d.c. voltage, using diodes and capacitors, from which electronic switches generate voltage pulses of frequencies ranging between 10 kHz and 100 kHz. These voltage pulses are then applied to the primary winding of a suitable transformer and, thereby, generate an impressed a.c. voltage in the secondary winding; said voltage being shaped to the desired output voltage by means of a rectifier and filter circuit. Then, this output voltage is conducted through a control unit in such a way that the desired charging current develops (cp. U. Tietze, Ch. Schenk: "Halbleiterschaltungstechnik", Springer-Verlag, 5th Edition, 1980, pages 395 ff.).

Moreover, it is well-known that, in units with single-phase mains connections, the line current may be conducted in a sinusoidal waveform if the rectified line voltage is further treated by a boost converter installed downstream the rectifier, a combination often called step-up converter (cp. U. Tietze, Ch. Schenk: "Halbleiterschaltungstechnik", Springer-Verlag, 5th Edition, 1980, pages 395, as well as M. Herfurth: "Aktives Oberschwingungs-filter mit konstanter Betriebsfrequenz und 600 W Ausgangsleistung", Semi-Conductor Application Report of SIEMENS, Print Reference PD 22 9002). In such a circuit, the rectified line current either flows through an inductor, which takes on magnetic energy, and an electronic switch, or through the inductor, the isolating diode and a voltage-determining element (capacitor, battery), energy being transmitted from the inductor to the voltage-determining element. The ON/OFF times of the electronic switch are controlled depending on the line voltage waveform so that a line current of an almost sinusoidal shape is developing. Here, the line current amplitude results from the required power to be converted. A corresponding control method is known from the application instructions for special integrated circuits (e.g. Claudio de Sa e Silva: Power Factor Correction with the UC 3854, Application Paper of UNITRODE).

With regard to batteries consisting of a string of series-connected battery blocks it is known that, due to always existing differences in capacity of the single battery blocks, the check for the sum of all block voltages to determine the charging level leads to different charging levels of the individual battery blocks. Single battery blocks may get damaged because of unnoticed exhaustive discharge or overcharge. DE 39 40 928 C1 describes how to prevent such effects. Accordingly, using the known principle of flyback converters, a certain energy quantity per time unit is withdrawn from the battery and, subsequently, supplied to the battery block with the lowest voltage. In this way, the average discharging current of a low-charged battery block is smaller than that of battery blocks with higher charge levels.

A major disadvantage of switched-mode power supply units with rectified voltages smoothed by capacitors is the pulse-shaped waveform of the line currents they generate. With consideration of the fuse elements prescribed for mains supply lines, in practice, power conversion capacities approximately half as big as the maximum power available from the mains on sinusoidal currents are obtained. Moreover, pulse-shaped line currents produce interference voltages across line impedances that may disturb other consumers connected to the same mains.

The application of the so-called step-up converter principle has the disadvantage of allowing to generate only one output voltage that must always be higher than the amplitude value of the line voltage. An electrical isolation between line voltage and output voltage does not exist. Regarding a.c. mains with an effective voltage of 230 volts, the amplitude of the line voltage is 325 volts. So, an isolated output voltage which is lower than the amplitude value of the line voltage can only be generated if the input voltage of the step-up converter is reduced by a line transformer. Usually, a power supply unit has to provide for several output voltages ranging between about 5 and 100 volts. It is very expensive to provide for a separate step-up converter including a line transformer for each output voltage to be generated. The rated voltage of traction batteries normally is less than 250 volts. Chargers for traction batteries shall have high charging capacities. In most cases an electric isolation is also required. Hence, a charger according to the step-up converter principle has to be fitted with a line transformer which, however, increases the weight and the volume of the charger unit considerably.

According to one embodiment of DE 39 40 928 C1 charge equalising is achieved by means of one single storage transformer having a separate secondary winding for each battery block. The disadvantage of this configuration is that, to obtain the desired effect, the magnetic coupling among the individual secondary windings as well as the coupling of each secondary winding and the primary winding must be the same. The realisation of such transformers gets the more difficult, the more battery blocks have to be monitored. Moreover, the number of battery blocks to be monitored is given by the number of existing secondary windings. Another embodiment assigns each battery block its own flyback converter. In this case, however, the expenditure in component parts both for the power electronics and signal processing is high. The circuitry of DE 39 40 928 C1 only relate to charge equalising among battery blocks; charging of a battery itself is not provided for.

SUMMARY OF THE INVENTION

The objective of the present invention is to provide for a power supply unit that does only draw active power from a single- or multi-phase mains avoiding undesired current harmonics, one that does not need any line transformer, and which is capable of generating one or several isolated output voltages, and, when being used as a battery charger, ensures continuous charge equalising between the single blocks of the battery both during charging and discharging cycles.

The general advantage of the configuration of the present invention is that the voltage adjusting transformers ensure an insulation between each output and the mains. So, it is either only one consumer or several consumers being galvanically not interconnected or several series-connected consumers that can be supplied. The output voltages are matched in a simple way by selecting the turn ratios of the voltage adjusting transformers. A line transformer is not necessary. Due to the high pulse frequency the volume of the voltage adjusting transformers can be kept small resulting in small converter weight and size. A suitable ON/OFF timing of the electronic switches allows to conduct the line current in a sinusoidal waveform and, hereby, enables high power to be drawn from the mains. In particular, it is possible to fully use the power available at household sockets, that is approx. 3.3 kW. The line current has no low-frequency harmonics producing distortions of the line voltages. Due to its modular configuration the power supply unit according to the present invention can be configured for different supply tasks at any time. In particular, battery charging requires several identical output circuits that are to be dimensioned for the charging power of one battery block each. Therefore, it is normally possible to do with easily available and reasonably priced component parts. The use of several identical components enables rationalised manufacturing of the power supply.

A configuration according to the present invention may equally be used for generating d.c. voltages, charging battery blocks, and charge equalising among several battery blocks. To generate d.c. voltages the output terminals are connected to capacitors as voltage determining elements. One single output voltage is measured and corrected to a preselected setpoint via a voltage control that is superimposed to the inductor current control. Since energy is always supplied to the most loaded output, or outputs resp., the remaining not measured output voltages are indirectly controlled, too— similarly to a fly-back converter system. They mainly develop according to the turn ratios of the voltage adjusting transformers. To charge a battery, each battery block is directly connected to the output terminals. A capacitor may, in addition, be connected in parallel to compensate the inner inductance of the battery block. During the initial charging phase, the battery blocks—starting with the block having the lowest voltage—are successively brought up to the same voltage. In the second phase, the battery blocks, now having identical voltages, are completely charged up to the final charging voltage without overcharging single battery blocks. In this way, it is made sure that each battery block obtains the maximum charge corresponding to its capacity. Harmful overcharging is avoided thus prolonging the service life of a battery. Battery maintenance by means of regular measurements of the battery voltages and well-aimed charging or discharging of single battery blocks is not needed. The permitted charging power of a battery block can be adjusted in a simple way if the control unit detects the number of battery blocks with the lowest voltage and presets for the converter a charging power corresponding to the determined number multiplied by the permitted maximum charging power of one single battery block. Because of the parallel connection of the output circuits at the converter output, the device is, at any time, capable of being matched to the number of battery blocks. During discharging cycles, the configuration according to the present invention enables low-capacity battery blocks to be supported advantageously. When the line voltage is not applied the switches SW are closed (cp. FIG. 1c) and the converter can be supplied from the battery itself. The energy withdrawn from the battery reaches the weakest battery block or blocks, respectively. Thereby, on the time average, a discharging current is drawn from the single battery blocks corresponding to their capacity, and it is made sure that, at any time, the charge levels of all battery blocks are equal.

Due to the unavoidable leakage inductances of the voltage adjusting transformers it takes a certain time until the current pulses supplied by the converter flow through the primary windings of the voltage adjusting transformers completely. Therefore, the voltage adjusting transformers have to be designed with as low leakage inductances as possible. As long as the current transfer is not completed, the difference between the current pulse supplied by the converter and the current flowing to the primary windings is taken on by a voltage limiter. The energy transmitted to the voltage limiter may, totally or partially, be recuperated to improve the efficiency by suitably designing said voltage limiter.

In another embodiment of the present invention (cp. FIG. 3), the inductor is connected to the line rectifier and to a bridge assembly of four electronic switches the a.c. connections of which lead to the parallel connected primary windings of the voltage adjusting transformers. In principle, this circuitry has the same features as the basic circuit shown in FIGS. 1a/1b/1c and has the additional advantage of enabling the secondary windings and isolating diodes to be, on the time average, loaded equally, which is favourably influencing the dimensioning of both the isolating diodes and the wire cross-section areas of the primary and secondary windings. In principle, there is the choice between a demagnetisation of the transformer cores during the charging of the inductor and a magnetic reversal during the transmission of a current pulse. If the transformer cores have been demagnetised at the beginning of the transmission of a current pulse the time which, due to the leakage inductances of the output circuits, is needed to fully transmit the current pulse to the output circuits is shorter, and the load on the voltage limiter is smaller than if a magnetic reversal of the transformer cores occurs during the transmission of a current pulse. The advantage of magnetic reversal, however, is that the transformer cores can be magnetised according to the so-called push-pull operation with varying signs, thus providing for a greater induction range. In this case, less core material is needed. Components only serving for demagnetising the transformers are not needed in the circuit according to FIG. 3.

Another embodiment of the present invention (cp. FIG. 4) is fitted with voltage adjusting transformers having a primary winding with a central tap. To avoid undesired circulating currents between the primary windings of several output circuits diodes DP forming additional components of the output circuits can be connected in series with each winding half. Each output circuit has three input terminals KX, KY, KZ at which it is connected in parallel to all the other output circuits. The sequence of current pulses generated by the converter is fed to the common connecting point of all central taps KX. Terminals KY and KZ leading to the winding ends via diodes are connected to an electronic switch each. This circuit, in principle, has the same features as the circuit depicted in FIG. 3, but can do with only three electronic switches and, to simplify the triggering of the switches, all these electronic switches can be connected to a common reference potential. Circulating currents between the voltage adjusting transformers may be prevented, which is advantageous for units having many or spatially separated output circuits.

Another embodiment of the present invention (cp. FIG. 5) has two inductors L1, L2 each being connected to the rectifier GR on the one hand and to a terminal of the parallel connected voltage adjusting transformers as well as to an electronic switch on the other. As long as an electronic switch is conducting, the inductor assigned to it is being charged. To transmit a current pulse to the output circuits one electronic switch has to be switched off and the other one must be conducting. Both electronic switches are triggered displaced by 180° related to the switching period. This results in two sequences of current pulses with different sign that are applied to the primary windings of the voltage adjusting transformers, thus resulting in push-pull operation. This circuit has an advantage over the above-described configurations acc. to FIGS. 1a/1b/1c and FIG. 3 as, with identical inductance values of the inductors and identical pulse frequencies of the electronic switches, the division of the power flow onto two inductors and two switches with displaced triggering results in a reduction of the distortion ripple of the line current, thus allowing smaller filter elements to suppress line current components with pulse frequency. The use of two inductors with half the current load offers design advantages over the application of one inductor having to be designed for the entire device capacity. The push-pull operation allows small transformer cores. Moreover, one can do with two electronic switches that are connected to one and the same reference potential, which facilitates the triggering of the electronic switches.

Another embodiment of the present invention (cp. FIG. 6) has two basic circuits connected in parallel at the output terminals of the rectifier each of them supplying energy to the voltage adjusting transformers via one of their two independent primary windings. To avoid circulating currents between the voltage adjusting transformers diodes DP can be connected as components of the respective output circuits to each primary winding. The two basic circuits are operated with a displacement of 180° related to the switching period. This circuit type has all the advantages indicated for the circuits according to FIGS. 1a/1b/1c, FIG. 3, and FIG. 5. All the electronic switches are connected to the same reference potential, which simplifies their triggering. The suppression of circulating currents by diodes connected in series with the primary windings of the voltage adjusting transformers is advantageous for units having many or spatially separated output circuits.

For a three-phase mains connection the objective of this invention is reached by connecting two of the above-described circuits in parallel at the output terminals, by connecting one a.c. terminal of each of the two rectifiers to a line terminal, by connecting the two remaining terminals of the rectifiers to the remaining line terminal, and by conducting two line currents by means of two independent control units in such a way that each of them is in phase with the line to line voltage across the a.c. terminals of the assigned rectifier (cp. FIG. 7).

The combination of two identical units simplifies the manufacture of devices with three-phase mains connections. In combination with standardised output circuits the power supply unit can easily be matched to varying requirements as regards number and value of the output voltages as well as power rating. Especially for units with high power rating, the splitting-up of the power into weaker components enabling the use of elements which are more easily to acquire or less expensive may be advantageous. As the neutral point of the mains is not connected the sinusoidal conduct of two line currents results in a sinusoidal waveform in the third phase as well. Hence, the mains is only loaded with active power.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1A:
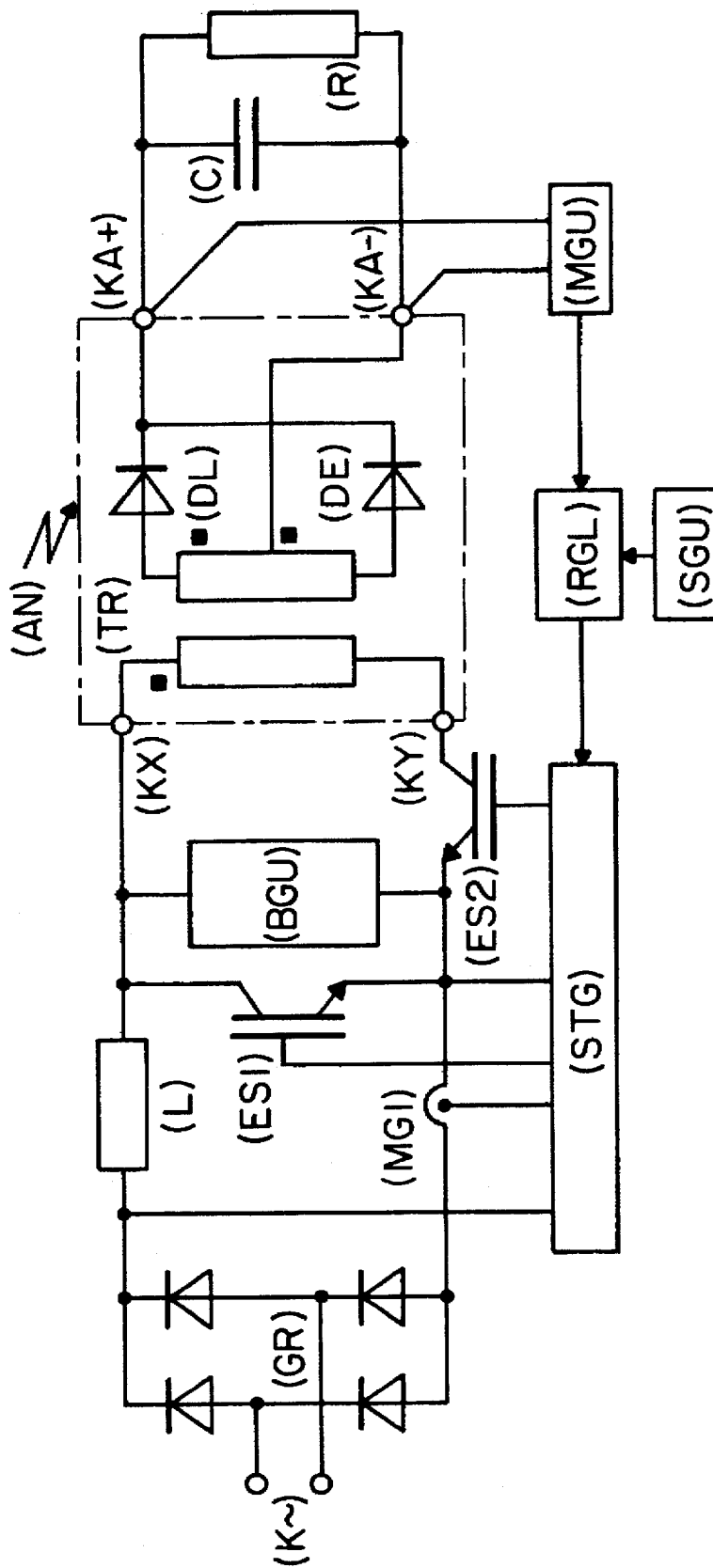
FIG. 1a is a block diagram of the basic circuit to generate an output d.c. voltage.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

In the basic circuit to generate an output voltage acc. to FIG. 1a, the line voltage is applied to the line terminals K– and rectified by a rectifier GR consisting of four diodes. Together with the two electronic switches ES1, ES2 (e.g. IGB Transistors) being alternatively switched ON and OFF within the kHz range and a voltage limiter BGU, an inductor L forms a converter with switched output. The converter is connected to the terminals KX and KY of an output circuit AN. The latter consists of a voltage adjusting transformer TR and isolating diodes DL ("changing diode") and DE ("demagnetising diode") which prevent a reverse current to the output circuit AN. The primary winding of the voltage adjusting transformer TR is connected to the terminals KX and KY. A capacitor C as a voltage determining element and a consumer R are connected across the output terminals of the output circuit AN. Capacitor C buffers the energy supplied to the consumer R via output circuit AN. The trigger signals for the electronic switches ES1, ES2 are generated by a control unit STG. When the electronic switch ES1 is conducting, the rectified line voltage is applied to the inductor L which, while this is being done, takes on magnetic energy. In this time, electronic switch ES2 is blocking so that the magnetic energy ES2 is blocking so that the magnetic energy that had been stored in the core of the voltage adjusting transformer TR during the preceding switching period is transmitted to the output. During demagnetisation, a current is flowing through isolating diode DE, terminal KA+ to the capacitor C as well as to the consumer R and from there via terminal KA− back to the central tap of the secondary winding. Due to the voltage at the capacitor C it decreases linearly as to time. The interval in which the electronic switch ES1 conducts and the electronic switch ES2 isolates, preferably, is longer than or equally long as half the switching period and is adjusted in dependence on the desired waveform of the line current. Subsequently, the electronic switch ES1 is kept off and the electronic switch ES2 kept on up to the end of the switching period. Then, the inductor L impresses a current pulse which flows across the primary winding of the voltage adjusting transformer TR. After an initial delay time which is dependent on the value of the leakage inductances of the voltage adjusting transformer TR, it is split up into one portion that serves for magnetising the transformer TR and another portion that corresponds to the current induced in the secondary winding. This is flowing via isolating diode DL, terminal KA+ to capacitor C and consumer R and from there via terminal KA− to the central tap of the secondary winding. As long as a current is flowing through isolating diode DL, part of the energy stored in the inductor L is transmitted to the capacitor C and the consumer R, the voltage at the primary winding and at electronic switch ES1 being multiplied by the turn-ratio of the primary and secondary winding. By repeatedly switching on and off the electronic switches ES1 and ES2 a sequence of current pulses is applied to the parallel connection of the capacitor C and the consumer R. When their energy, on the time average, is identical to the energy dissipated by the consumer R, the capacitor voltage is almost constant. The latter is measured by an isolating voltage measuring unit MGU and adjusted by a voltage controller RGL. The voltage controller RGL presets the line current amplitude necessary to maintain the capacitor voltage (which is identical to preset the power to be converted) for the control unit STG in dependence on the measured capacitor voltage and the capacitor voltage setpoint preset by a setpoint device SGU. The control unit STG, using the current measuring unit MGI, measures the output current of the rectifier GR which corresponds to the current flowing across the inductor L and determines the ON and OFF signals for the electronic switches ES1, ES2 in such a way that the current through the inductor L is analogue to the absolute value of a sinusoidal function. Then, the line current is sinusoidal. The electronic switch ES1 being OFF and the electronic switch ES2 being ON, the current in the secondary winding, and likewise the corresponding current portion in the primary winding, due to the unavoidable leakage inductances of the voltage adjusting transformer TR, does not increase steplike but like a ramp. The difference between the current pulse impressed by the inductor L and the current through the primary winding is taken on by a voltage limiter BGU. The smaller the leakage inductances of the voltage adjusting transformer TR, the faster the increase of the current in the secondary winding and the less the energy to be taken on by the voltage limiter BGU. When the unit transmits very little power, the current pulse impressed by the inductor L may be shorter than the ON period of the electronic switch ES2 determined by the control unit STG. In this case, an undesired additional magnetising current driven by the rectified line voltage may develop across the primary winding of the voltage adjusting transformer TR. This can be avoided by prematurely switching off the electronic switch ES2. A criterion for switching off is a rapidly decreasing primary voltage at the voltage adjusting transformers TR after a current pulse has been transmitted. To prevent an undesired magnetising current when converting extremely low power, it is generally sufficient to switch off all electronic switches after a voltage breakdown across the primary windings. This also applies to all circuits described hereafter.

Figure 1B:
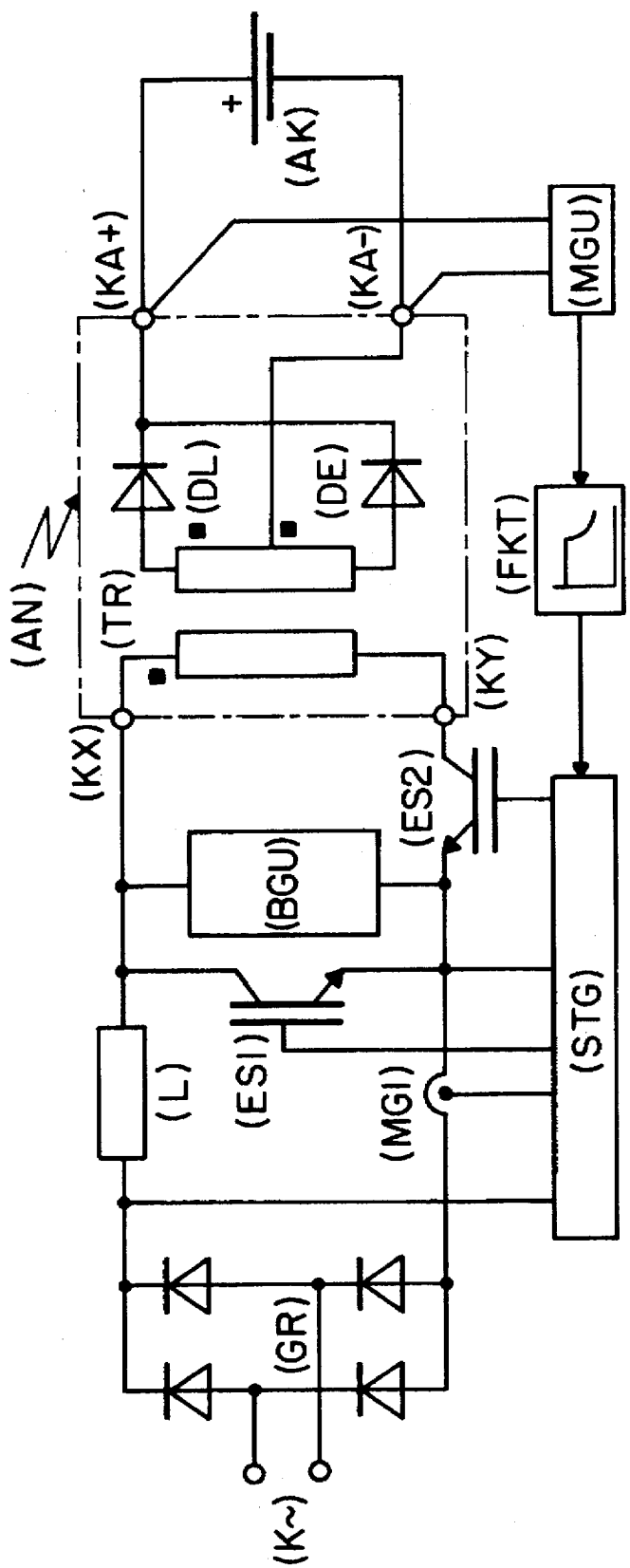
FIG. 1b is a block diagram of the basic circuit to charge a battery block.

FIG. 1b shows a block diagram of the basic circuit for charging a battery. The battery AK is connected to the output terminals KA+ and KA− of the output circuit AN. As, in comparison with capacitors, batteries have high capacities the voltage at the battery AK only changes very slowly. For the control of the charging procedure it is therefore sufficient to have the battery voltage checked by an isolating voltage measuring unit and evaluated by a function block FKT. The latter presets the charging power for the control unit STG. As a rule, it is the maximum permitted power from the start of the charging procedure for some time and decreases continuously when approaching the end-of-charge voltage. Control of the electronic switches ES1, ES2 and energy transmission are done as described for FIG. 1a.

Figure 1C:
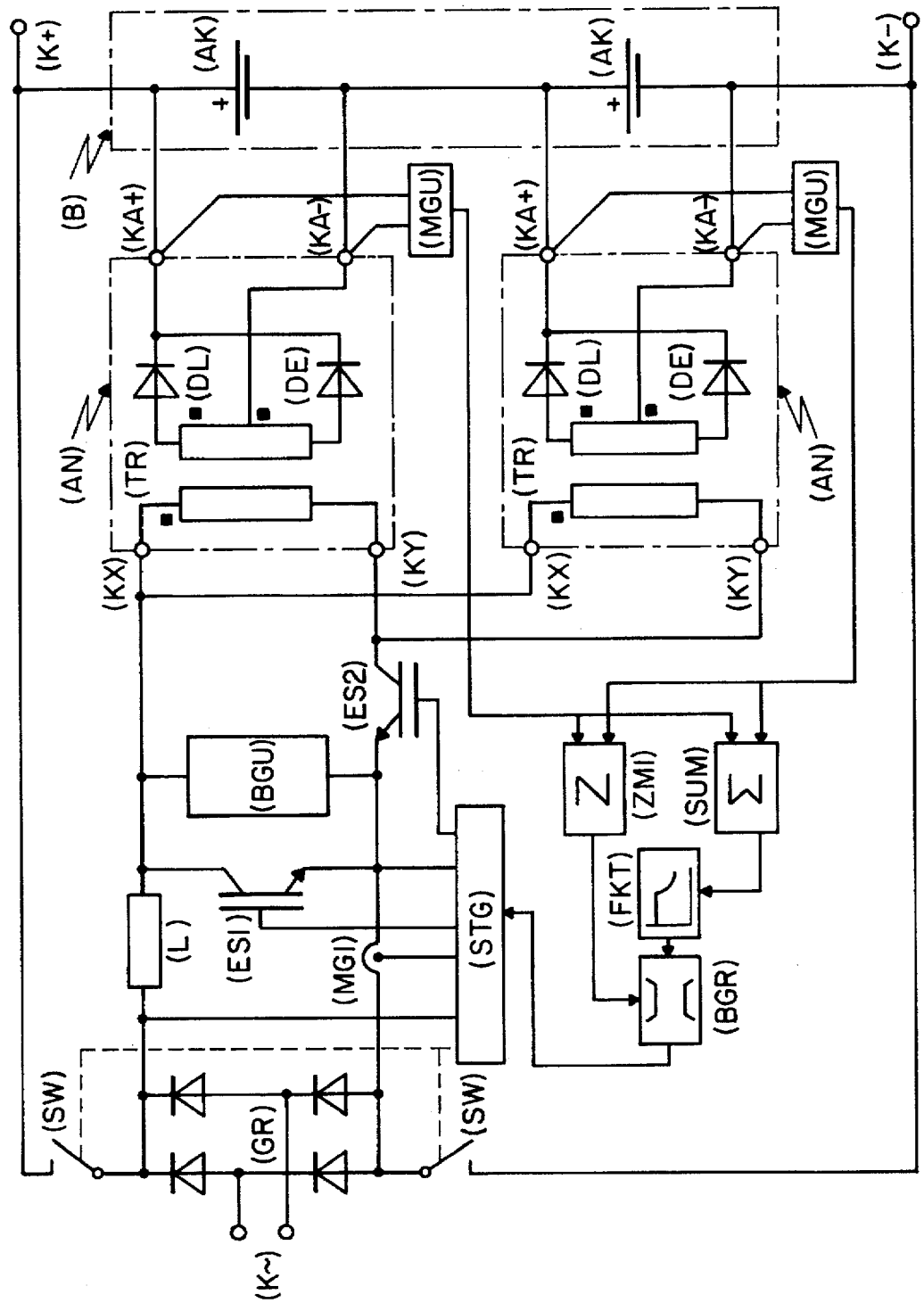
FIG. 1c is a block diagram of the basic circuit to charge a battery consisting of two series-connected battery blocks.
Figure 2:
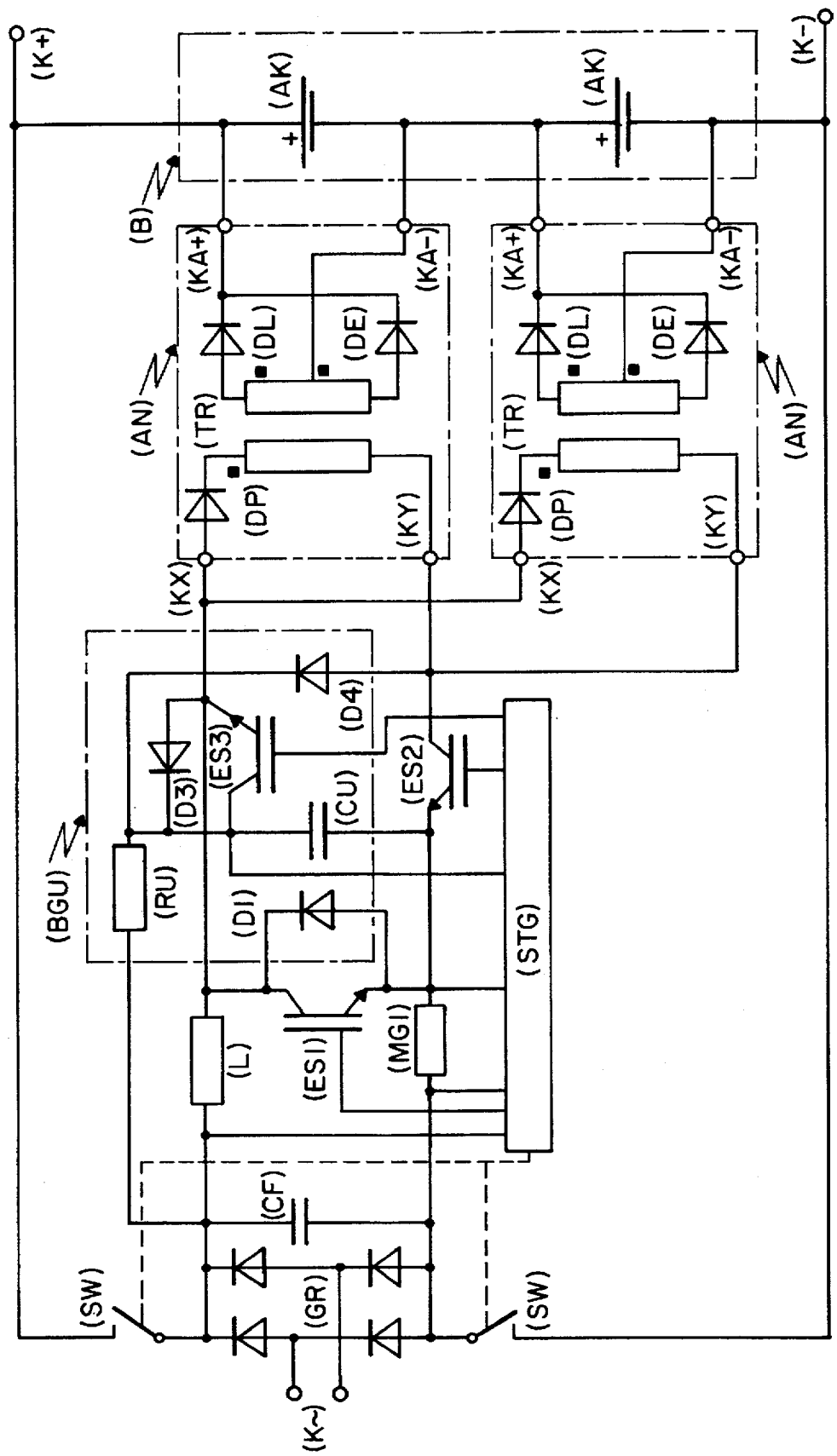
FIG. 2 depicts an embodiment of the power section of the basic circuit.

FIG. 1c depicts the basic circuit for charging battery strings and for charge equalising among several battery blocks. As each battery block AK has an output circuit AN with an isolation ensured by the voltage adjusting transformers TR it is of no importance whether individual battery blocks AK or series-connected battery blocks AK or a combination of single and series-connected battery blocks AK shall be charged. The same applies to charge equalising. Usually, batteries are composed of a string of identical series connected battery blocks AK, which justifies the use of identical output circuits AN. To simplify matters, FIG. 1c depicts a battery B consisting of two series-connected battery blocks AK. Each battery block AK is connected to an output circuit consisting of a voltage adjusting transformer TR and the isolating diodes DL and DE. The primary windings of the voltage adjusting transformers TR are connected in parallel at the terminals KX, KY and to the converter output. To charge the battery blocks AK the line voltage is applied to the line terminals K~ while the switches SW are in the OPEN position. To achieve charge equalising during the discharge of battery B or during recuperation, the line terminals K~ are OPEN and the switches SW closed. In this case, the circuit is supplied from battery B. For battery charging as well as charge equalising, the converter composed of the inductor L, the electronic switches ES1, ES2, and the voltage limiter BGU is switched as described for FIG. 1a. During the demagnetising phase, each voltage adjusting transformer TR shortly generates a current that flows to the battery block AK being connected to the respective output circuit. If the output circuits AN are identical, the current pulse impressed by the inductor L is, at the beginning, a magnetising current that evenly split up on each voltage adjusting transformer TR. In the output circuit AN with the battery block AK having the lower voltage, the isolating diode DL gets conductive first. The voltage of this battery block AK, then, determines the primary voltage of all voltage adjusting transformers TR; as a consequence, the isolating diode DL of the output circuit AN that is connected to the battery block AK with the higher voltage stays isolated. Thus, energy from the inductor L only gets to the battery block AK with the lower voltage via the respective voltage adjusting transformer TR and the respective isolating diode DL. As long as, at one output circuit AN, the energy of the currents generated by demagnetisation is lower than the one transmitted while the electronic switch ES1 is OFF, it is, on the time average, the battery block with the lower voltage that is mainly supplied with energy. This condition can be met by suitably dimensioning the voltage adjusting transformers TR and by control measures. If the two battery block voltages are identical, the two isolating diodes DL are conductive at the same time. Then, if the output circuits AN are equal, identical energy portions flow from the inductor L to the battery blocks AK. If a consumer is connected to battery terminals K+ and K− and no line voltage is applied, the voltage at the weaker battery block AK decreases faster than that at the stronger battery block AK. If the converter is then supplied from the battery B through the switches SW, the energy the converter is taking from the battery B automatically reaches the battery block AK with the lowest voltage and, thus, reduces, on the time average, its discharge current while the discharge current of the battery block AK with the higher voltage increases. When battery B is supplied with energy through battery connection terminals K+ and K− (recuperation), the voltage at the low-capacity battery block AK increases faster than that at the high-capacity battery block AK. In this case, the energy the converter draws from the battery B automatically reaches the high-capacity battery block AK. The low-capacity battery block AK, on the time average, takes on less energy than the high-capacity block. If, during discharge of battery B or at a recuperation, both voltages are identical, charge equalising is not needed and the circuit is switched off. Output circuits AN are dimensioned for the maximum charging power of a single battery block AK. In order not to overload the output circuits AN the converter only must convert as much energy per time unit as is corresponding to the number of battery blocks AK having the lowest voltage. To determine this number a control element ZMI which evaluates the isolating voltage measuring units MGU is needed. The output signal of the control element ZMI acts on a limiter BGR. It reduces the power to be transferred, which a function block FKT previously derived from the battery voltage, to the permitted value. The total battery voltage is summed from all battery block voltages by a functional block SUM. To prevent undesired circulating currents between the primary windings diodes may, without any function losses, be connected in series to the primary windings as further components of the output circuits (cp. FIG. 2).

FIG. 2 shows an embodiment of the basic circuit shown in FIG. 1c which features series diodes DP connected to the primary windings to suppress undesired circulating currents between the voltage adjusting transformers TR. The current measuring unit MGI is formed by a single resistor. To prevent the inductor current components of higher frequency caused by the switched mode of the controls from flowing across the power cables a filter capacitor CF is integrated in parallel to the rectifier GR. When the electronic switch ES1 is switched off, the unavoidable leakage inductances of the voltage adjusting transformers TR delay the transfer of the current pulses from the inductor L to the voltage adjusting transformers TR. During this delay time, the voltage limiter BGU takes on the differential current. It flows through the main BGU components, i.e. diode D3 and capacitor CU. The differential currents gradually charge the capacitor CU so that a discharge circuit is needed to ensure a given voltage at the capacitor CU. The latter consists either of a discharge resistor RU allowing to recuperate part of the energy buffered at the rectifier GR or of an electronic switch ES3 or of a combination of the two. The use of the electronic switch ES3 allows to recuperate the entire energy stored on capacitor CU. Together with the electronic switch ES2, it will always be switched on when the inductor L impresses a current pulse. As long as the diode D3 is conducting, the capacitor CU is being charged (proceeding from a preset minimum voltage) and electronic switch ES3 is bypassed. As long as the diode D3 is blocking, the capacitor CU can discharge via the electronic switch ES3 and the primary windings of the output circuits AN, the energy from the capacitor being supplied to the battery block with the lowest voltage. At that moment the voltage at capacitor CU decreases below the preset minimum voltage, the electronic switch ES3 is switched off. The diodes D1, D4 ensure a current path for the demagnetisation of the primary leakage inductances of the voltage adjusting transformers TR when the electronic switch ES2 is switched off. In practice, these diodes are usually not needed since the energy stored in the primary leakage inductances of the voltage adjusting transformers TR is so insignificant that it is taken on by the winding capacitances. To simplify matters FIG. 2 and the following figures only outline the control unit. The components to determine the power to be transmitted known from FIG. 1c are omitted.

Figure 3:
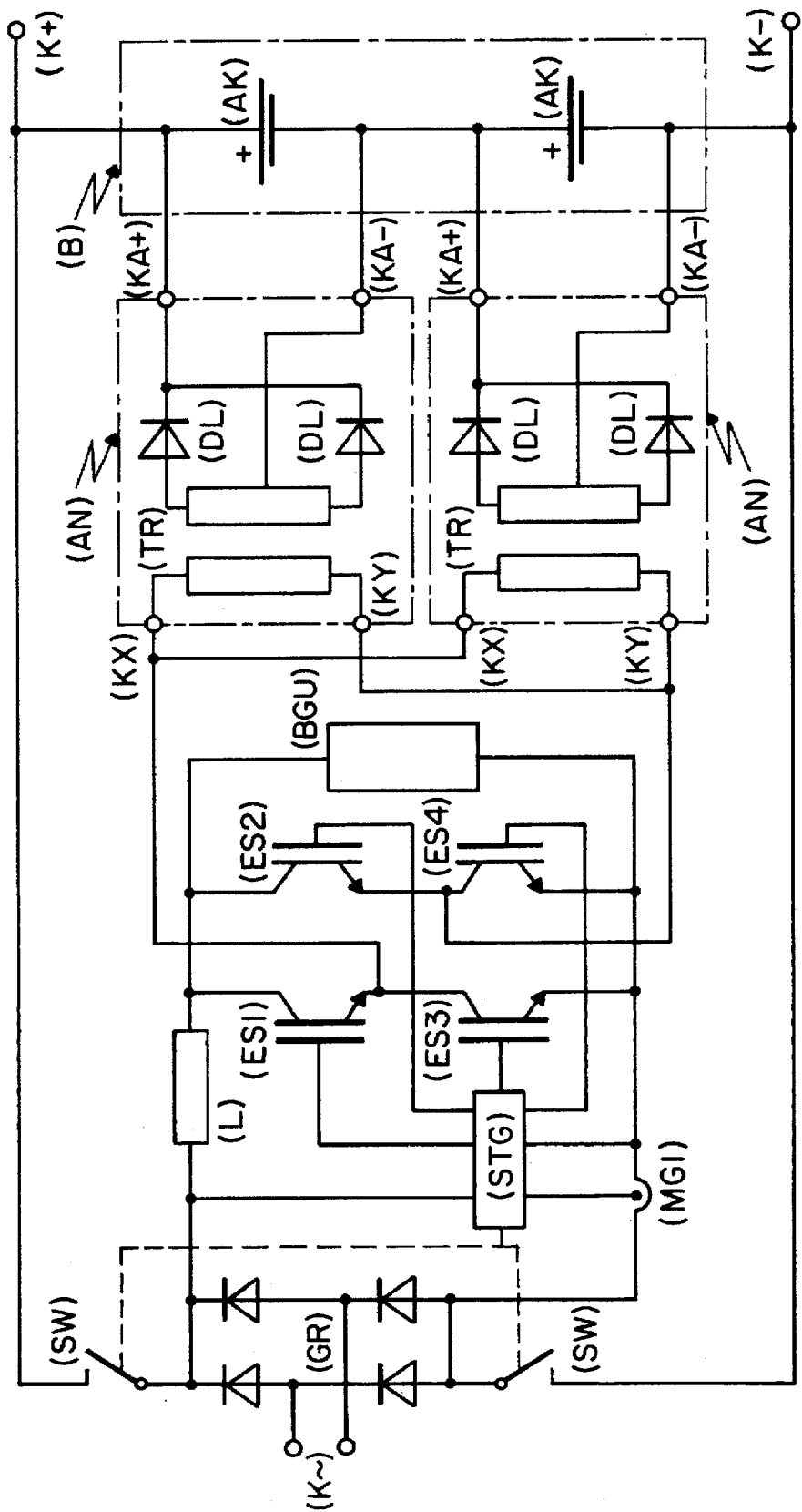
FIG. 3 is a block diagram of a circuit having an inductor and four electronic switches in bridge configuration.

The embodiment shown in block diagram FIG. 3 incorporates a converter with a bridge assembly of four electronic switches ES1, ES2, ES3, and ES4. This allows to preset the current flow direction through the primary windings and to influence the operating mode of the voltage adjusting transformers TR. The timing of the electronic switches is done analogue to the explanations of FIG. 1a, the only difference being that it is always at least two electronic switches that are conducting. If the voltage adjusting transformers TR shall be demagnetised while the inductor L is being charged, either electronic switches ES1 and ES3 have to be switched on and electronic switches ES2 and ES4 switched off or vice versa. If all electronic switches only allow one direction of the current flow and can take on isolating voltages in both directions, then one line to the output circuits AN connected in parallel at the terminals KX and KY is interrupted so that the magnetising currents previously flowing into the primary windings are commutating into the secondary windings and the magnetic energy stored in the cores of voltage adjusting transformers TR reaches battery blocks AK. Upon completion of the charging of the inductor L, a current pulse flowing to terminals KX is generated by switching on electronic switches ES1 and ES4 and switching off the other two switches. When the electronic switches ES2 and ES3 are conducting and the other two are not conducting, a current pulse flowing to terminals KY is generated. If the sign of the current pulses through the primary windings is changed for each switching period, the two halves of the secondary winding of a voltage adjusting transformer and diodes DL are, on the time average, loaded uniformly. This is expressed by equally marking the isolating diodes with DL. The push-pull operation of the voltage adjusting transformers TR is characterised by the fact that the magnetisation of the transformer cores only changes during the transfer of a current pulse. Otherwise, the magnetisation of the voltage adjusting transformers TR remains almost constant. This is achieved by short-circuiting all primary windings during the charging of the inductor L. In order to enable short-circuit currents with different signs in the primary windings all the electronic switches must, at any time, be capable of conducting a current of any sign. This may always be achieved by means of an inverse-conducting diode connected parallel to the respective electronic switch. In the push-pull operation mode double the induction range may be utilised as compared to the demagnetising operation mode. This allows to use smaller transformer cores. Alternatively, the voltage limiter BGU may also be connected in parallel to the terminals KX and KY if it is capable of limiting voltages with varying signs.

Figure 4:
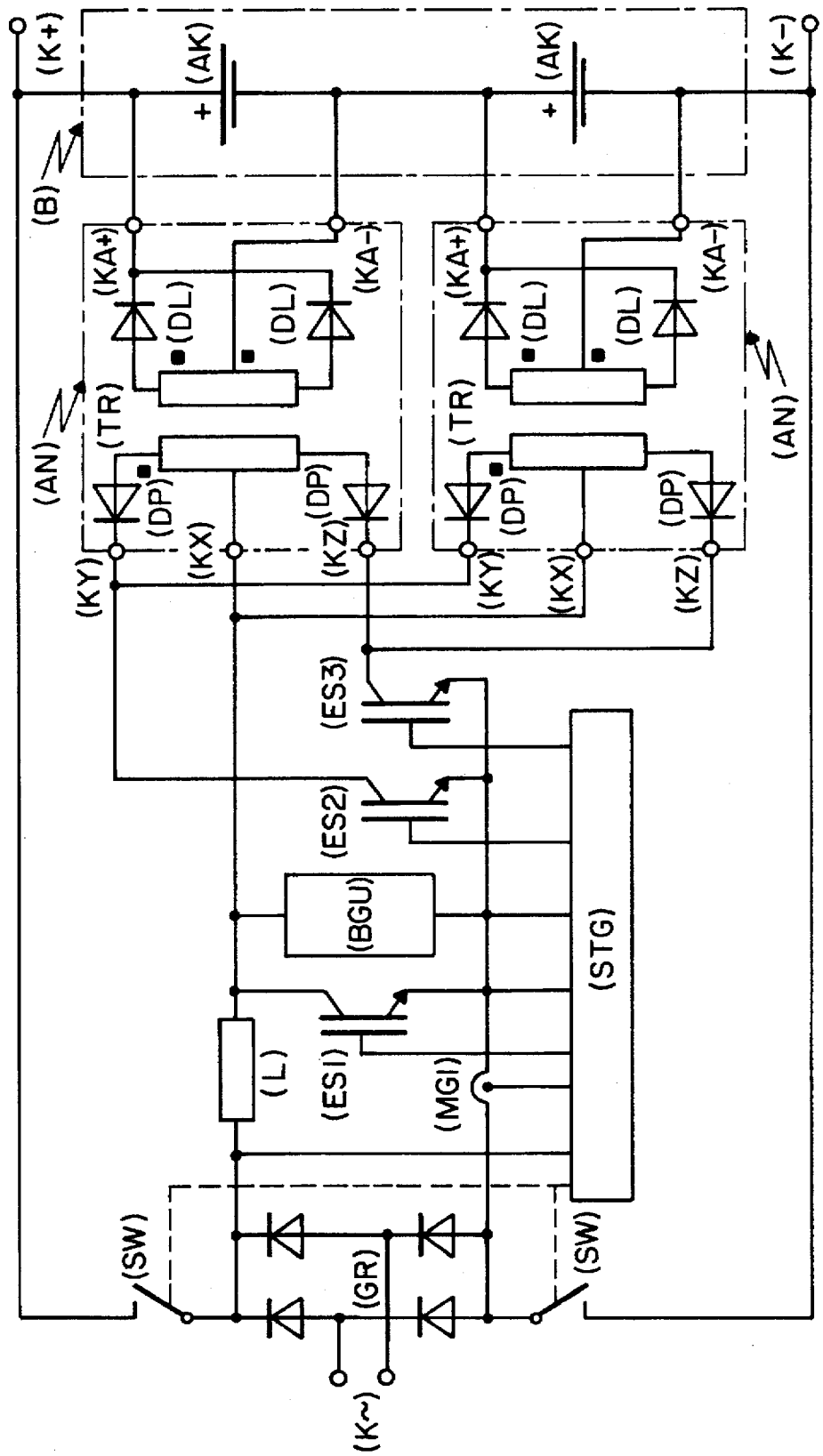
FIG. 4 is a block diagram of a circuit having an inductor and three electronic switches.

The circuit according to FIG. 4 includes a converter that, as compared to the basic circuit, has another output line fitted with the electronic switch ES3. The primary windings of the voltage adjusting transformers TR are provided with a central tap each that conducts to terminal KX. To avoid circulating currents between the voltage adjusting transformers TR the ends of the primary windings may be connected with a series diode each to the terminals KY and KZ of the output circuits AN. At the terminals KX, KY, and KZ, all output circuits are connected in parallel. The inductor L is charged by switching on the electronic switch ES1. The current pulse impressed by the inductor L, while the electronic switch ES1 is switched off, flows to the terminals KX and from there either across one half of the primary windings to the terminals KY and the electronic switch ES2 (with ES3 isolating) or across the other half of the primary windings, the terminals KZ, and the electronic switch ES3 (with ES2 isolating), while the signs of the magnetisation of each transformer core are varying. At the electronic switch that is not involved in the current flow, the magnetic coupling between the two halves of the individual primary windings generates a maximum isolating voltage double the voltage adjusted at the voltage limiter BGU. If the cores of the voltage adjusting transformers TR shall be demagnetised during the ON-period of the electronic switch ES1, the electronic switches ES2 and ES3 remain OFF for this time. If one does without the series diodes DP, the electronic switches ES2, ES3 must only permit one current flow, direction and must be capable of taking on isolating voltages of different signs. If the electronic switch ES1 always allows an inverse current the above-described push-pull operation is achieved by switching on all the electronic switches while the inductor L is charged.

Figure 5:
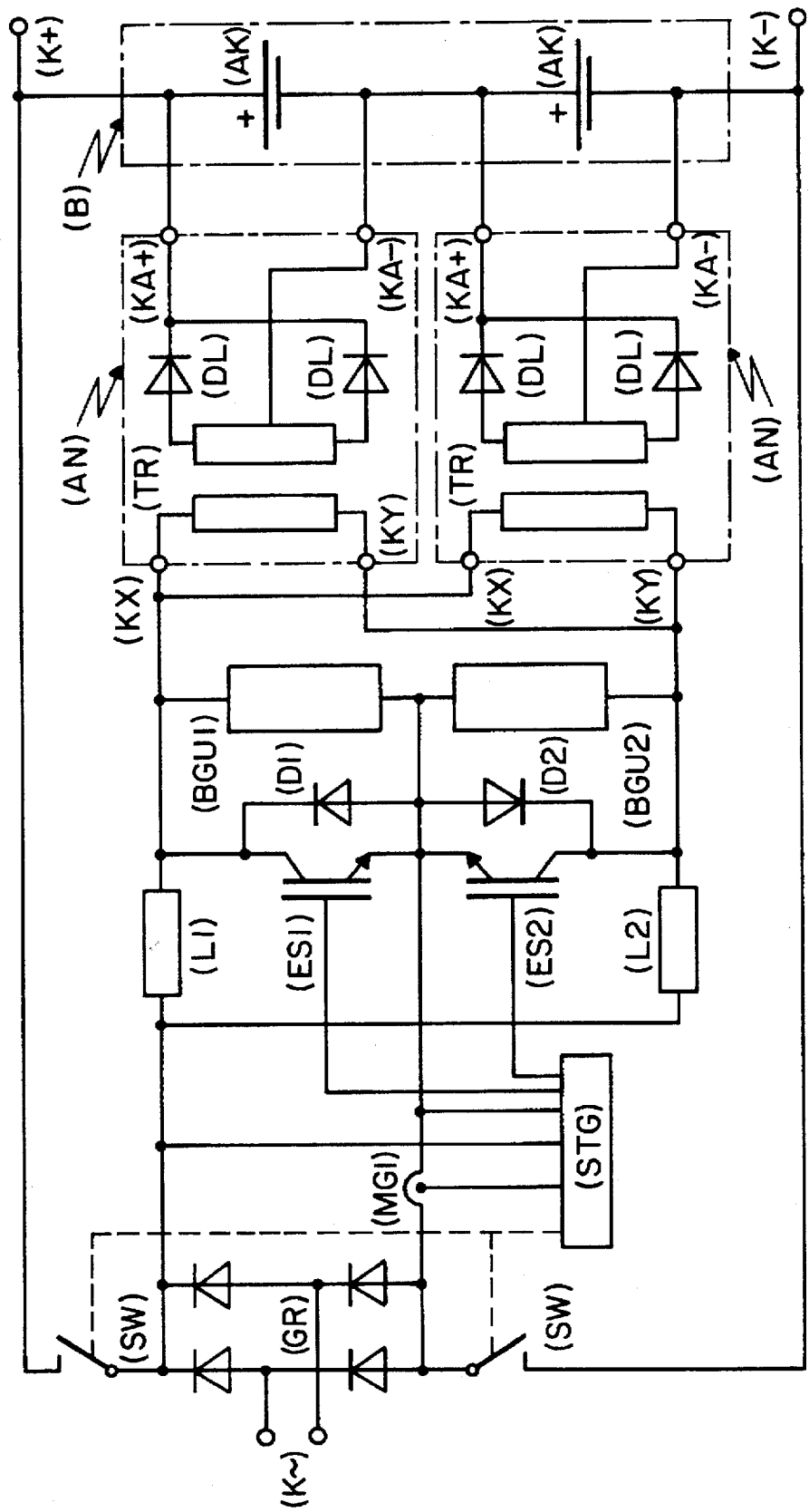
FIG. 5 is a block diagram of a circuit having two inductors and two electronic switches.

According to the circuit shown in FIG. 5 the power to be converted is split up on two converters. They consist of the electronic switch ES1, the inductor L1, and the voltage limiter BGU1, and of the electronic switch ES2, the inductor L2, and the voltage limiter BGU2 respectively. Both converters are supplied with energy from rectifier GR or, if switches SW are closed, from battery B. The inductors L1, L2 are each dimensioned for half the maximum power of the unit. When the electronic switch ES1 is switched off and the electronic switch ES2 is conducting, the inductor L1 impresses a current pulse that flows to the terminals KX across the primary windings, to the terminals KY of the output circuits AN, and across the electronic switch ES2, while inductor L2 is being charged. When the electronic switch ES2 is switched off and the electronic switch ES1 is conducting, the current pulse impressed by the inductor L2 flows in the inverse direction, while the inductor L1 is being charged. While all electronic switches are conducting, both inductors L1, L2 are charged and the terminals KX and KY are short-circuit. Only in very special cases (e.g. transmission of extremely low power, fault conditions) it is reasonable to switch off both electronic switches. If an identical ON/OFF time ratio is preset for the electronic switches ES1, ES2 and the switching cycles are displaced by 180° during one switching period, a positive current pulse, a short circuit, a negative current pulse, and another short circuit are successively applied to the output circuits AN connected in parallel at the terminals KX and KY. The short-circuit phases only enable a push-pull operation. For this purpose, the two electronic switches, when conducting, have to be capable of carrying a current of any sign. To fulfil this condition the electronic switches can additionally be fitted with inverse-conducting diodes D1 and D2. If the inductances of the inductors L1, L2 and the pulse frequency are adjusted to the same values as for the circuits according to FIGS. 1a/1b/1c to FIG. 4, the circuit acc. to FIG. 5, due to the displaced switching, leads to a more favourable ripple spectrum of the line current, which reduces the necessary filtering measures. Alternatively, it is possible, at a given permitted ripple of the line current, to adjust a lower inductance of the inductors L1, L2. As an alternative to the two voltage limiters BGU1, BGU2 a voltage limiter that is capable of limiting a voltage with varying sign may be connected in parallel to the terminals KX and KY. If one of the two lines to the terminals KX and KY can be interrupted via electronic switches, partial demagnetisation can be performed as described for the circuit according to FIG. 6.

Figure 6:
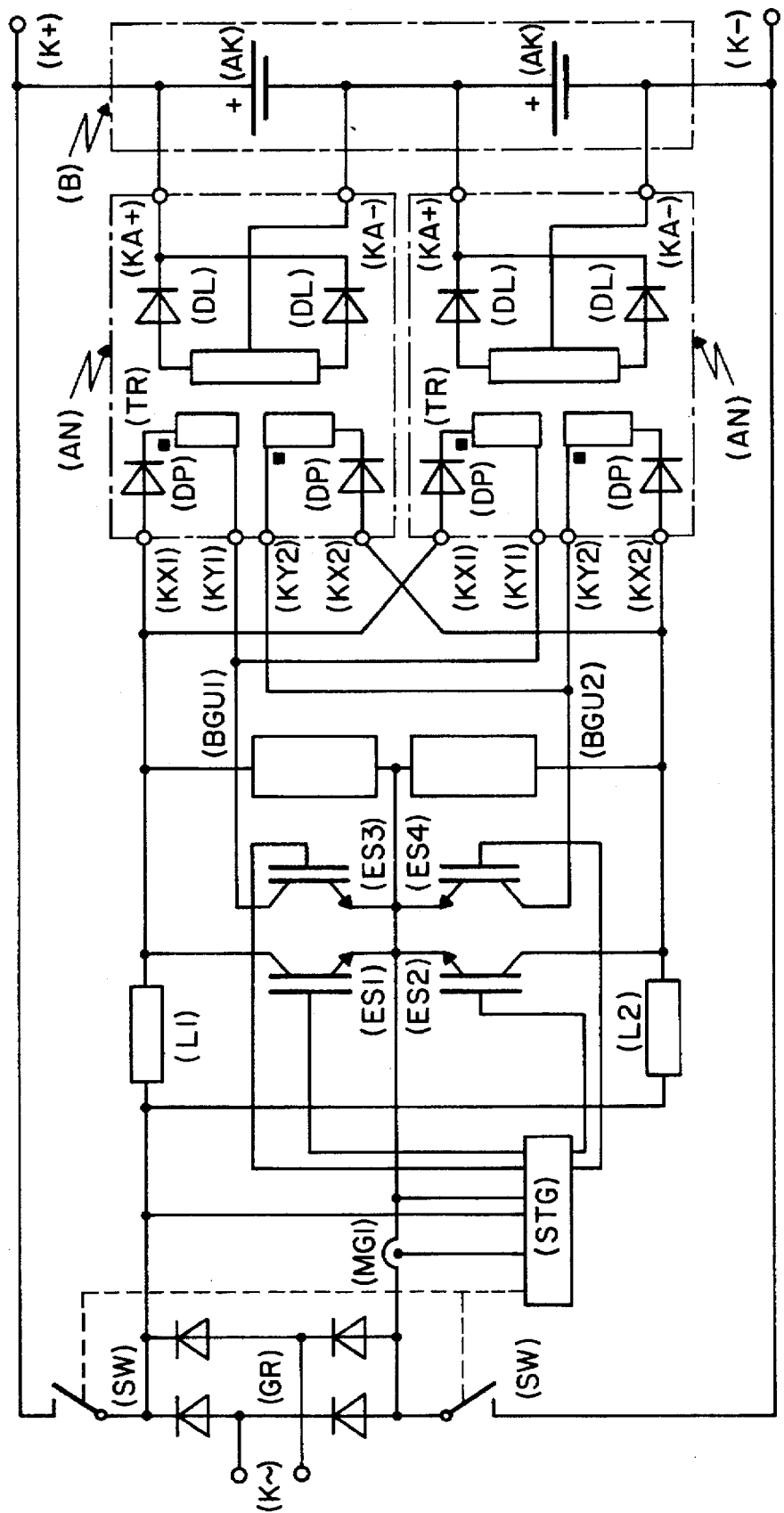
FIG. 6 is a block diagram of a circuit having two inductors and four electronic switches.

The circuit according to FIG. 6 includes two converters with one switched output each. They consist of the electronic switches ES1, ES3, the inductor L1, and the voltage limiter BGU1, and the electronic switches ES2, ES4, the inductor L2, and the voltage limiter BGU2 resp., and are both supplied with energy from the mains through the rectifier GR or, if the switches SW are closed, from battery B. The voltage adjusting transformers TR of the output circuits AN have two independent primary windings each, each winding being assigned to a converter. A series diode DP may be connected to each primary winding in order to suppress circulating currents between the voltage adjusting transformers TR. When the electronic switches ES1 and ES4 are OFF and the electronic switches ES2 and ES3 are ON, the inductor L1 impresses a current pulse that is flowing to the terminals KX1 of all output circuits AN and then to terminals KY1 and the electronic switch ES3, the inductor L2 being charged simultaneously. When the electronic switches ES2 and ES3 are OFF and the electronic switches ES1 and ES4 are ON, the inductor L2 impresses a current pulse that is flowing to the terminals KX2 of all output circuits AN and then to terminals KY2 and the electronic switch ES4, the inductor L1 being charged simultaneously. When a current pulse is impressed, the energy reaches the battery blocks AK with minimum voltage as described above. The two converters run with a displacement of 180° related to the switching period. If the charge period for an inductor is longer than the transfer period of a current pulse, the intervals in which one of the inductors impresses a current pulse will always be followed by times in which both inductors are charged at the same time; during this time, the switching state of the electronic switches ES2 and ES4 determines whether the push-pull operation is achieved by a short circuit between the terminals KX1 and KY1, and KX2 and KY2 resp., or by a partial demagnetisation of the transformer cores. If, in that time, the electronic switches ES2 and ES4 are conducting and the electronic switches ES1 and ES2 allow an inverse current, the currents in the primary windings can continue flowing in short circuits. If, however, the electronic switches ES2 and ES4 are not conducting, the transformer cores are partially demagnetised via the secondary windings; here, the electronic switches ES2 and ES4, doing without the series diodes DP, must only allow one current direction and have to take on isolating voltages in both directions. Before a total demagnetisation will take place, the displaced switching of the converter results in a transmission of another current pulse and, thus, in a magnetic reversal of the transformer cores starting from the magnetising state existing at the end of the partial demagnetisation. The current pulses impressed by the inductors L1 and L2 cause different signs of the magnetisation so that all windings of one voltage adjusting transformer TR and the assigned isolating diodes DL are, on the time average, loaded equally.

Figure 7:
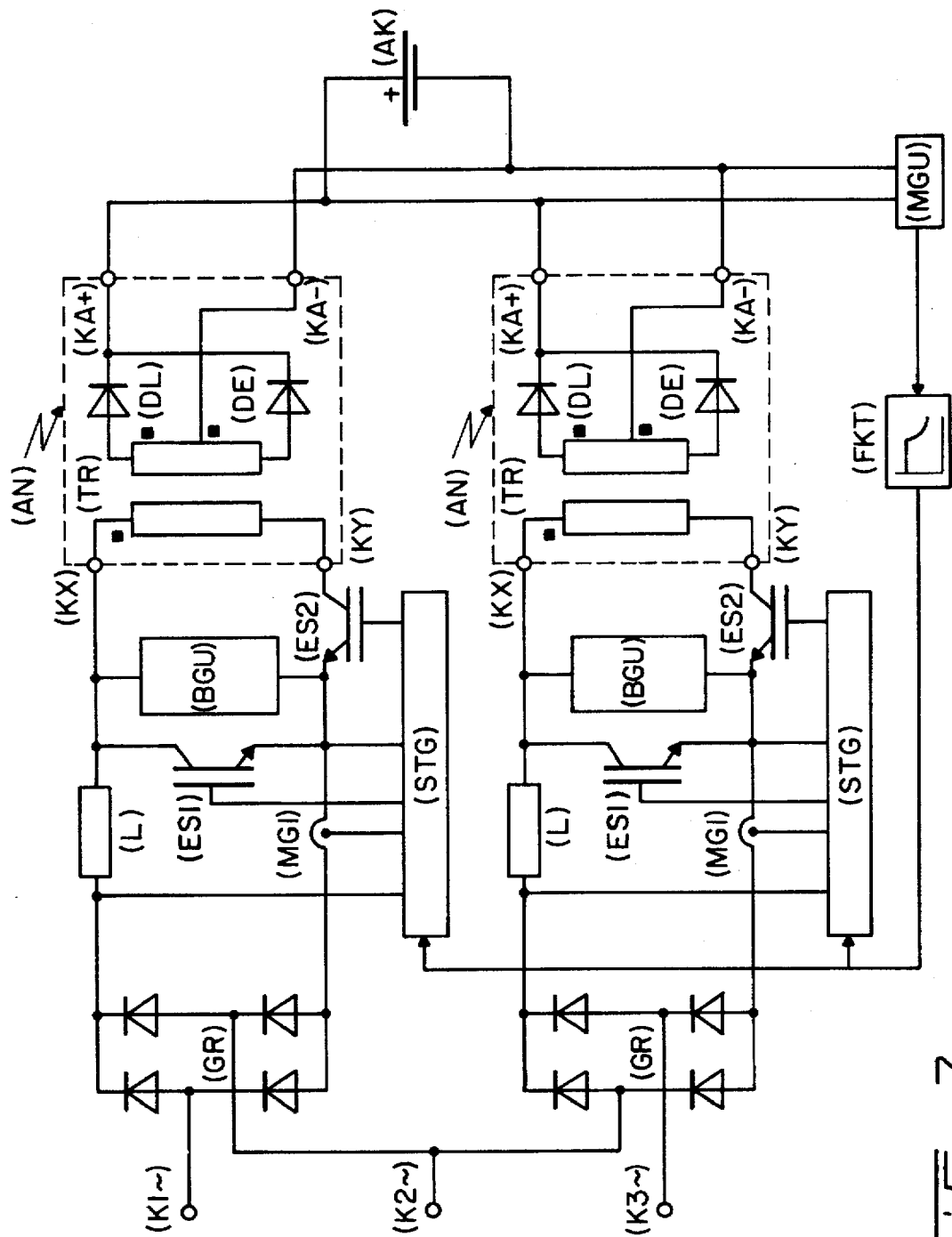
FIG. 7 is a block diagram of a circuit with three-phase mains connection.

FIG. 7 shows a block diagram of a device with a three-phase mains connection. It consists of two basic circuits according to FIG. 1b. To simplify matters the figure only shows one battery block AK that is connected to the output terminals KA+ and KA− of each output circuit AN. To feed further battery blocks each basic circuit may have several output circuits. The rectifiers GR are connected to the three-phase mains via three mains terminals K1~, K2~, K3~, one mains terminal being common to both rectifiers GR. In FIG. 7, this is the terminal K2~. So, the two basic circuits are operating at line voltages that are displaced by 120°. The line currents flowing through the rectifiers GR are adjusted in phase to these line voltages by the control unit STG. If the neutral of the mains is not connected, all line currents will have sinusoidal waveforms. The amplitude of all line currents is preset by the function block FKT in dependence on the voltage of the battery block AK determined by means of the voltage measuring unit MGU. In general, a symmetric three-phase current system is developing if each basic circuit transmits the same power. As an alternative to the basic circuits each of the configurations shown in FIGS. 3 to 6 may be applied.

Figure 8:
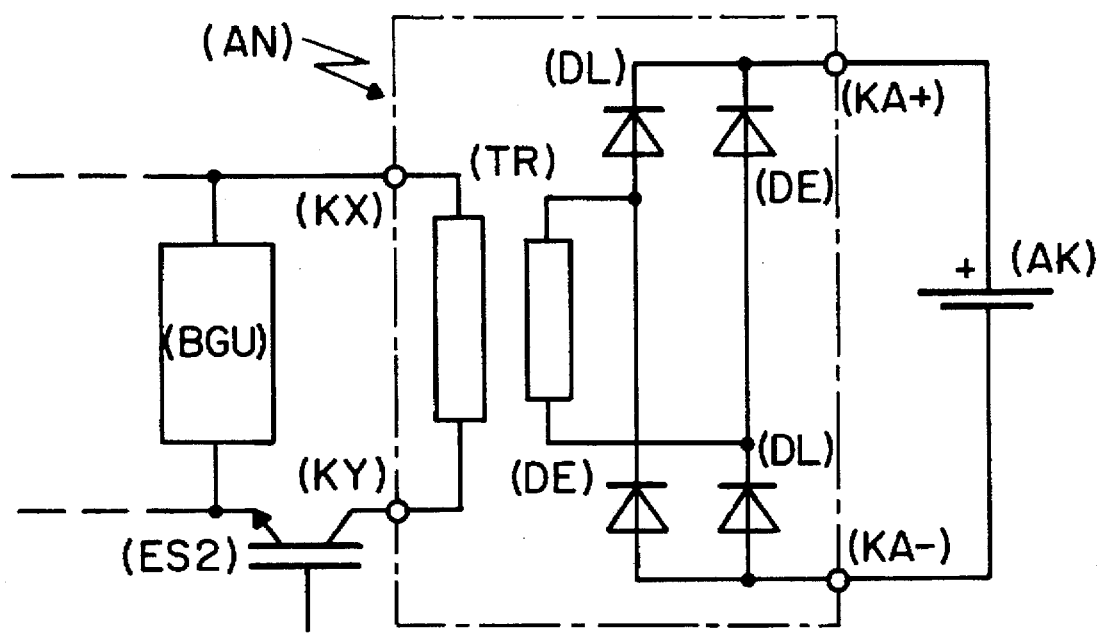
FIG. 8 depicts another embodiment of an output circuit.

FIG. 8 shows an output circuit AN that, compared to the output circuits described above, has a voltage adjusting transformer TR with only one secondary winding and, at the output, a bridge assembly consisting of two isolating diodes DL ("charging diodes") and DE ("demagnetising diodes"). The converter and one battery block AK are connected to the terminals KX, KY, and KA+, KA− resp., of the output circuit as shown in FIG. 1b. To simplify matters FIG. 8a only depicts the components of the converter that are necessary for the connection of the output circuit AN. Apart from the double voltage drop of the bridge connection the output circuit AN acc. to FIG. 8 is equivalent to the output circuits AN shown in FIGS. 1a/1b/1c. The circuits according to FIGS. 3 to 6 may also be fitted with output circuits AN acc. to FIG. 8, whereby, due to the uniform current loading, a differentiation between the single isolating diodes is not necessary.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. A timed power supply apparatus for one of a single-stranded and multiple-stranded mains connection, comprising:

at least one inputside rectifier;

at least one active element for generating a sequence of current pulses, said active element including at least one choke coil, at least one pair of electronic switches, and a voltage limitation effective only in transfer actions, said voltage limitation coupled to said rectifier, said active element having switches generating a series of current pulses from one of a rectified mains voltage and a direct voltage source cut in;

at least two matching networks for potential-separated transmission of the current pulses, said matching networks coupled to said voltage limitation, each of said matching networks including a pair of output terminals, each matching network including a matching transformer and a plurality of blocking diodes connecting said output terminals to a secondary coil system of said matching transformer, with primary coil systems of said matching networks being wired in parallel with one another, said current pulses of said active element flowing only to those outputs that carry the lowest voltage, and whose energy flows at equality of voltage on all outputs at equal parts to all outputs due to different transformer reactions of voltages prevailing across said output terminals of said matching networks on the primary voltage of said matching transformers;

a voltage-determining element connected to each one of said pair of output terminals, said voltage-determining element being one of an accumulator and a capacitor; and a controller, said controller activating said electronic switches, said controller generating control commands for said electronic switches in a way such that in mains operation a sinusoidal mains current flows while in direct-voltage operation a smoothed current is drawn from the direct voltage source, and with the output to be transmitted being specified to said controller at minimal voltage in contingence on a characteristic stored in a function generator and on the number of output channels.

2. The timed power supply apparatus of claim 1 wherein said direct-voltage source cut in of said switches includes a series-wiring of at least two voltage-determining elements connected to outputs of said matching networks.

3. The timed power supply apparatus of claim 1 further comprising a bridge circuit including four electronic switches wherein said choke coil is connected to said rectifier and said bridge circuit.

4. The timed power supply apparatus of claim 1 wherein said primary coil of said matching transformers has a center tap and said active element includes three electronic switches.

5. The timed power supply apparatus of claim 1 further comprising two choke coils, one of said choke coils being connected to one pole of said rectifier and each of said choke coils being connected to one of two leads of said primary coils of said matching transformers, said choke coils also being connected to a first line of two electronic switches, and the second line of said two electronic switches extends to the other pole of said rectifier.

6. The timed power supply apparatus of claim 5 wherein said matching transformers have two primary coils, each said primary coil connecting to one of said two choke coils and one of said electronic switches and allowing switching to the other pole of said rectifier via a second electronic switches.

7. The timed power supply apparatus of claim 5 wherein said plurality of diodes are wired in series with each leg of a primary coil of one of said matching transformers.

8. The timed power supply apparatus of claim 5 further comprising two circuits including at least one of said matching networks, one of said rectifiers, one of said active elements, and output side wiring in parallel, one alternating-current terminal of each of said two rectifiers connects to one leg of a tri-phase voltage system, the other terminals of said two rectifiers connect to the third leg of the tri-phase voltage system, and the mains currents of said rectifiers are managed by two of said controllers in contingence on the mains voltages prevailing across said rectifiers, that said rectifiers are in phase with the voltages carried on the mains.

* * * * *